(No Model.)
J. C. JOHNSTON.
CAR COUPLING.
No. 355,612. Patented Jan. 4, 1887.
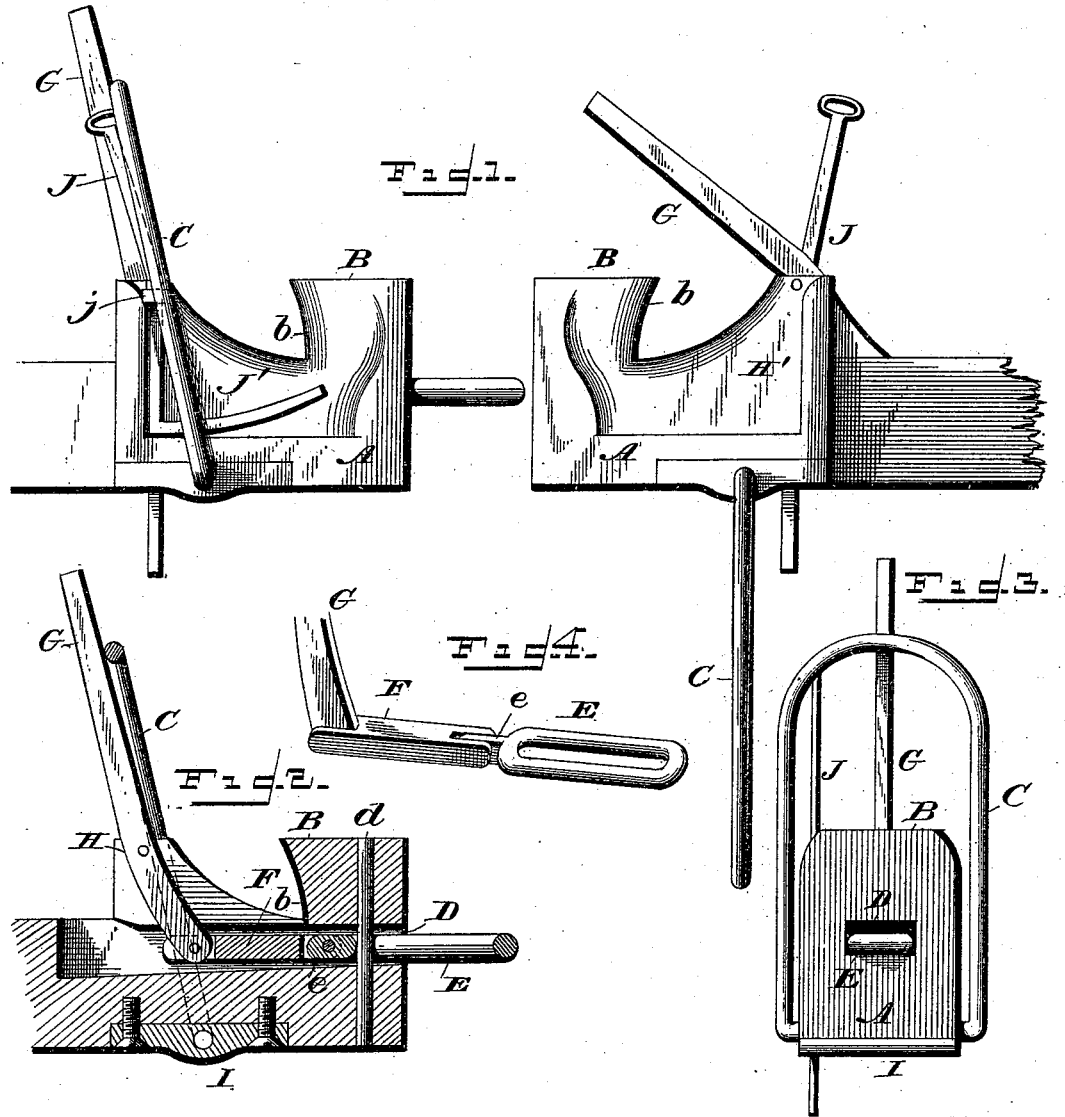
WITNESSES
G. S. Elliott
E. W. Johnson
Jesse C Johnston
INVENTOR
Attorney

UNITED STATES PATENT OFFICE.

JESSE C. JOHNSTON, OF DOUGLASS, KANSAS.

CAR-COUPLING.

SPECIFICATION forming part of Letters Patent No. 355,612, dated January 4, 1887.

Application filed October 7, 1886. Serial No. 215,602. (No model.)

*To all whom it may concern:*

Be it known that I, JESSE C. JOHNSTON, a citizen of the United States of America, residing at Douglass, in the county of Butler and State of Kansas, have invented certain new and useful Improvements in Car-Couplers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in car-couplings, the object of the same being to provide a car-coupler which will be automatic in operation, and which can be employed either in connection with my especially-constructed draw-head or in connection with a draw-head of ordinary construction; and to this end my invention consists in the construction and combination of the parts, as will be hereinafter fully set forth, and specifically pointed out in the claims.

In the accompanying drawings, which illustrate my invention, Figure 1 is a side view of a pair of draw-heads constructed in accordance with my invention. Fig. 2 is a vertical longitudinal section taken through the center of a draw-head constructed as shown in Fig. 1. Fig. 3 is a front view, and Fig. 4 is a detail perspective view.

A refers to the draw-head, which is provided at its front end with an upwardly-projecting portion, B, the forward portion of which has a straight edge. The rear part of the upwardly-projecting portion B is curved, as shown at *b*, while the wall curves upwardly and rearwardly from the base thereof, so as to provide a notch within which will lie the curved portion of the coupling loop or bail C.

The draw-head is provided centrally with a longitudinal opening, D, within which the coupling-link E slides, said coupling-link having a rearwardly-extending tongue, *e*, to which is pivoted a connecting-bar, F, which also slides longitudinally within the recess or opening D. The rear end of the link E is pivotally attached to the lower end of a pivoted bar, G, said bar being pivoted within a longitudinal recess, H, which is formed centrally between the upwardly-projecting portions H' of the draw-head, said bar G being of sufficient length to extend above the loop C when the same is turned upwardly, as shown in Figs. 2 and 3. The link E is prevented from having an excessive longitudinal movement within the recess by a pin, *d*, which passes through vertical openings in the draw-head, said openings bisecting the opening D.

The loop or bail C has inturned ends, which engage with perforations in a transverse plate, I, which is bolted or otherwise secured to the under side of the draw-head. To one side of the draw-head is attached a vertically-sliding bar, J, which slides within a recess formed in the side, and is guided by an eye, *j*, at the upper portion of the draw-head, while its lower portion passes through a perforation in the lower portion of the draw-head on a line therewith, and said bar J is provided with a forwardly-projecting member, J', which can be elevated by drawing upon the upper end of the bar J, so as to bring the forward end of the same on a line with the upper end of the upwardly-projecting portion B, so that the loop can be raised from the recess at the rear of the same, so as to be disengaged therefrom.

In coupling cars with my improved coupler and draw-head the loop or bail on one of the draw-heads is swung over the draw-head, so as to occupy a position as shown in Fig. 2, and by bearing against the pivoted bar G it will force the link E out of the recess in the draw-head, the opposite loop or bail C being permitted to hang down under the draw-head. Now, when the cars are brought together, the opposite draw-head will abut against the link, so as to force the same inwardly, and thus cause the upper end of the pivoted bar to move forward, so as to throw the link downwardly and into the recess in the opposite draw-head, thus coupling the cars to each other.

When it is desired to uncouple cars, the loop or bail may be raised, so as to disengage from the recess, by simply drawing the bar J upwardly. The member thereof engaging with the loop will elevate the same, so as to slide over the draw-head. Cars having draw-heads of ordinary construction may be coupled to my improved draw-head and coupling by permitting the loops or bails C to hang downwardly under the draw-head, while the link E is thrown outwardly, so as to enter the ordinary draw-head, to which it may be secured by the usual coupling-pin.

I claim—

1. In a car-coupling, a draw-head provided with an upwardly-projecting portion, B, and a central longitudinal recess, in combination with a link, E, having a connecting-bar, F, pivoted thereto and to a pivoted lever, G, and a loop or bail, C, pivotally attached to the under side of the draw-head, so that when the same is turned upwardly over the draw-head it will engage with the bar G, substantially as shown, and for the purpose set forth.

2. In a car-coupling, the combination, with a draw-head constructed substantially as described, of a pivoted bar, G, having a connecting bar and link attached thereto, a bail, C, pivoted to the under side of the draw-head, and a sliding bar, J, with a forwardly-projecting member, which is adapted to be moved upwardly, so as to disengage the bail from the draw-head, substantially as shown, and for the purpose set forth.

3. The combination, in a car-coupler, of a draw-head having an upwardly-projecting portion, B, the rear portion of which is curved, a longitudinal recess, D, within which is located a sliding link and connecting-bar, a lever, G, pivoted to the rear portion of the draw-head, a bail, C, adapted to swing around the front portion and over the draw-head, so as to engage with the upper end of the lever G, and a sliding bar, J, with the forwardly-projecting member J', the parts being organized substantially as shown, and for the purpose set forth.

In testimony whereof I affix my signature in presence of two witnesses.

JESSE C. JOHNSTON.

Witnesses:
H. C. HUMPHRIES,
H. B. SEYMOUR.